US007079588B1

(12) United States Patent
Doucette et al.

(10) Patent No.: US 7,079,588 B1

(45) Date of Patent: Jul. 18, 2006

(54) METHOD AND APPARATUS FOR PROCESSING SIGNALS IN AN ARRAY ANTENNA SYSTEM

(75) Inventors: Paul E. Doucette, Plano, TX (US); James R. Toplicar, Plano, TX (US); Roger M. Ikeda, Plano, TX (US)

(73) Assignee: Raytheon Company, Waltham, MA (US)

( * ) Notice: Subject to any disclaimer, the term of this patent is extended or adjusted under 35 U.S.C. 154(b) by 784 days.

(21) Appl. No.: 10/028,009

(22) Filed: Dec. 21, 2001

(51) Int. Cl.
*H04L 27/04* (2006.01)

(52) U.S. Cl. .................................................... 375/295

(58) Field of Classification Search ................ 375/254, 375/295, 299, 316, 347, 349, 358, 329, 330, 375/332, 273, 296, 297; 332/100
See application file for complete search history.

(56) References Cited

U.S. PATENT DOCUMENTS

| | | | | |
|---|---|---|---|---|
| 3,887,918 | A | | 6/1975 | Bailey |
| 4,688,045 | A | | 8/1987 | Knudsen |
| 4,749,995 | A | | 6/1988 | Hopwood et al. |
| 4,839,652 | A | | 6/1989 | O'Donnell, et al. |
| 4,886,069 | A | | 12/1989 | O'Donnell |
| 4,983,970 | A | | 1/1991 | O'Donnell, et al |
| 5,084,708 | A | | 1/1992 | Champeau et al. |
| 5,223,843 | A | | 6/1993 | Hutchinson |
| 5,271,034 | A | | 12/1993 | Abaunza |
| 5,414,433 | A | | 5/1995 | Chang |
| 5,461,389 | A | | 10/1995 | Dean |
| 5,475,392 | A | | 12/1995 | Newberg et al. |
| 5,517,529 | A | | 5/1996 | Stehlik |
| 5,764,187 | A | | 6/1998 | Rudish et al. |
| 5,930,299 | A | * | 7/1999 | Vannatta et al. ............ 375/269 |
| 5,943,010 | A | | 8/1999 | Rudish et al. |
| 6,031,485 | A | | 2/2000 | Cellai et al. |
| 6,052,085 | A | | 4/2000 | Hanson et al. |
| 6,091,941 | A | * | 7/2000 | Moriyama et al. .......... 455/126 |
| 6,141,371 | A | | 10/2000 | Holmes et al. |
| 6,160,505 | A | | 12/2000 | Vaishampayan |
| 6,191,735 | B1 | | 2/2001 | Schineller |
| 6,198,731 | B1 | * | 3/2001 | Hamada et al. ............. 370/335 |
| 6,201,451 | B1 | * | 3/2001 | Hata .......................... 332/100 |
| 6,240,122 | B1 | * | 5/2001 | Miyashita .................. 375/130 |

(Continued)

FOREIGN PATENT DOCUMENTS

GB 2 130 798 A 6/1984

(Continued)

OTHER PUBLICATIONS

U.S. Appl. No. 09/519,069, filed Mar. 3, 2000, entitled "Digital Phased Array Architecture and Associated Method", by inventor Gary A Frazier, text pp. 1-31 and 3 drawing sheets.

(Continued)

*Primary Examiner*—Emmanuel Bayard
(74) *Attorney, Agent, or Firm*—Baker Botts L.L.P.

(57) ABSTRACT

An antenna system (10), includes a plurality of antenna elements (21–25). Respective analog signals corresponding to respective antenna elements are subjected to respective phase shifts, are digitized using one-bit samples, are then subjected to an equal and opposite phase shift, and are subsequently combined so that the fundamental components add coherently and the harmonic components add noncoherently. A digital-to-analog converter is supplied with successive samples, and produces in response to each sample a pulse having a duration which is less than the time period between successive samples.

28 Claims, 4 Drawing Sheets

U.S. PATENT DOCUMENTS

| | | | | |
|---|---|---|---|---|
| 6,249,249 | B1 * | 6/2001 | Obayashi et al. | 342/371 |
| 6,259,253 | B1 * | 7/2001 | Ellingson | 324/322 |
| 6,396,884 | B1 * | 5/2002 | Maruyama | 375/344 |
| 6,430,232 | B1 * | 8/2002 | Patire | 375/302 |
| 6,549,566 | B1 * | 4/2003 | Lee et al. | 375/219 |
| 6,570,441 | B1 * | 5/2003 | Sasaki | 329/306 |
| 6,631,174 | B1 * | 10/2003 | Asahara et al. | 375/344 |
| 6,693,980 | B1 * | 2/2004 | Linder et al. | 375/329 |
| 6,771,709 | B1 * | 8/2004 | Huang et al. | 375/296 |
| 2003/0095608 | A1 * | 5/2003 | Duperray | 375/297 |
| 2004/0166813 | A1 * | 8/2004 | Mann et al. | 455/69 |

FOREIGN PATENT DOCUMENTS

| | | |
|---|---|---|
| GB | 2 313 711 A | 12/1997 |
| WO | WO-01/67548 A2 | 9/2001 |

OTHER PUBLICATIONS

Wong, A.C.C., “Radar Digital Beamforming”, Standard Telecommunication Laboratories, Harlow, Essex, U.K., Military Microwaves Conference 1982, Oct. 20, 1983, cover sheet and pp. 287-294.

Caputi, William J., “Stretch: A Time-Transformation Technique”, IEEE Transactions on Aerospace and Electronic Systems, vol. AES-7, No. 2, Mar. 1971, pp. 269-278.

Brown, et al., “Digital L-Band Receiver Architecture With Direct RF Sampling”, IEEE Position Location and Navigation Symposium, Apr. 1994, pp. 209-216 plus IEEE abstract sheet.

Song, William S., “A New 3-GSPS 65-GOPS UHF Digital Radar Receiver and Its Performance Characteristics”, Thirty-First Asilomar Conference on Signals, Systems & Computers, Nov. 1997, vol. 2, pp. 1542-1546 plus IEEE abstract sheet.

Thompson, Rick et al., “An 8-Bit 2-Gigasample/Second A/D Converter Multichip Module for Digital Receiver Demonstration on Navy AN/APS-145 E2-C Airborne Early Warning Aircraft Radar”, IEEE Trans on CPMT Part B, vol. 21, No. 4, Nov. 1998, pp. 447-462.

Brinegar, C., et al. “Design of an Integrated RF Filter for the Direct Digization Front End of a Dual GPS/GLONASSS Software Radio Receiver”, IEEE RAWCON ’98 Proceedings, Aug. 1998, cover sheet and pp. 277-280.

Ho, K.C., et al., “A Digital Quadrature Demodulation System”, IEEE Trans. on AES, vol. 32, No. 4, Oct. 1996, pp. 1218-1227.

U.S. Appl. No. 09/567,543, filed May 5, 2000, entitled “Phased Array Antenna Data Re-Alignment”, by inventors G. Van Andrews, et al., 22 pages of text and 4 drawing sheets.

U.S. Appl. No. 09/478,035, filed Jan. 5, 2000, by inventors James R. Toplicar et al., entitled “Method and Apparatus for a Digital Phased Array Antenna”.

Guirong, et al. “Mixer-free All Digital Quadrature Demodulation”, IEEE Proceedings of the Fourth International Conference on Signal Processing (ICSP), Oct. 12, 1998, vol. 2, pp. 1704-1707 and an index sheet.

Brown, A. et al., “Digital Downconversion Test Results with a Broadband L-Band GPS Receiver”, IEEE Digital Avionics Systems Conf. Oct. 1994, cover sheet and pp. 426-431.

Eerola, V. et al., “Direct Conversion Using Lowpass Sigma-Delata Modulation”, Proc. IEEE Int’l Symposium on Circuits and Systems, May 1992, cover sheet and pp. 2653-2656.

Steyskal, Hans, “Digital Beamforming at Rome Laboratory”, Microwave Journal, U.S. Horizon House, Dedham, vol. 176, No. 2, Feb. 1996, pp. 100, 104, 107-8, 110, 113-4, 116, 119-120, 122,-124, 126.

* cited by examiner

METHOD AND APPARATUS FOR PROCESSING SIGNALS IN AN ARRAY ANTENNA SYSTEM

TECHNICAL FIELD OF THE INVENTION

This invention relates in general to array antenna systems and, more particularly, to a method and apparatus for processing signals in an array antenna system.

BACKGROUND OF THE INVENTION

A standard phased array antenna system includes an antenna section with a plurality of antenna elements that are arranged in a two-dimensional array of rows and columns. A central waveform generator and a transmitter produce an analog signal which is to be transmitted, and this analog signal is then supplied to each of the antenna elements through respective devices that impart to the signal a respective phase shift and/or time delay. In a large array which handles wideband signals, a simple phase shift is typically not sufficient, and the capability to effect time delays must be provided.

This involves for each antenna element a relatively large and heavy analog steering section, which is expensive and consumes a significant amount of power. In fact, the steering section commonly includes long-time delay units, short-time delay units, phase shifters, and switching arrangements for routing signals among the various time delay units and phase shifters. The steering sections for different antenna elements of the same system usually need to be matched and/or calibrated, which is cumbersome and adds to the expense. These existing steering sections are also subject to dispersion that results in transmission losses and smaller available signal bandwidths. Although the discussion here is presented in the context of waveform transmission, similar considerations apply with respect to waveform reception.

Attempts have been made to develop suitable alternative approaches. One pre-existing approach involved the provision of several waveform generators and transmitters which each served a respective portion of the array, such that problems due to dispersion and transmission loss could be reduced. However, problems involving size, weight, power, cost, matching and calibration of the steering sections were still present.

Another known approach is disclosed in U.S. Ser. No. 09/478,035 filed Jan. 5, 2000, which is assigned to the same Assignee as the present application. This application disclosed an approach for processing received signals using primarily digital circuitry rather than the traditional analog circuitry. While this approach was suitable for its intended purposes, it was not satisfactory in all respects. As one aspect of this, it focused on reception and was thus advantageous for a passive system which involved only reception of signals. But in the case of an active system which needed to transmit signals, it was still necessary to provide the traditional analog steering sections with time-delay units and phase shifters, with the associated disadvantages.

SUMMARY OF THE INVENTION

From the foregoing, it may be appreciated that a need has arisen for a method and apparatus for processing signals primarily digitally within an array antenna system. According to a first form of the present invention, a method and apparatus are provided to address this need, and involve: producing first and second digital signals, the first digital signal representing a predetermined waveform with a first phase shift imparted thereto in relation to a reference, the second digital signal representing substantially the predetermined waveform with a second phase shift different from the first phase shift imparted thereto in relation to the reference; converting the first and second digital signals respectively into first and second analog signals; imparting to the first analog signal a phase shift which is substantially equal and opposite to the first phase shift in order to obtain a first adjusted signal, and imparting to the second analog signal a phase shift which is substantially equal and opposite to the second phase shift in order to obtain a second adjusted signal; and combining the first and second adjusted signals.

According to a different form of the present invention, a method and apparatus involve: generating a digital signal having a plurality of successive states; and converting the digital signal into an analog signal, including generating for each state of the digital signal a respective corresponding analog pulse which has a duration less than the duration of the corresponding state, and outputting a predetermined voltage between successive pulses.

According to yet another form of the present invention, a method and apparatus involve: producing first and second analog signals, the first analog signal representing a predetermined waveform and the second analog signal representing substantially the predetermined waveform; imparting to the first analog signal a first phase shift to obtain a first shifted signal, and imparting to the second analog signal a second phase shift different from the first phase shift to obtain a second shifted signal; converting the first and second shifted signals respectively into first and second digital signals; imparting to the first digital signal a phase shift which is substantially equal and opposite to the first phase shift in order to obtain a first adjusted signal, and imparting to the second digital signal a phase shift which is substantially equal and opposite to the second phase shift in order to obtain a second adjusted signal; and combining the first and second adjusted signals.

BRIEF DESCRIPTION OF THE DRAWINGS

A better understanding of the present invention will be realized from the detailed description which follows, taken in conjunction with the accompanying drawing, in which.

DETAILED DESCRIPTION OF THE INVENTION

Figure 1:
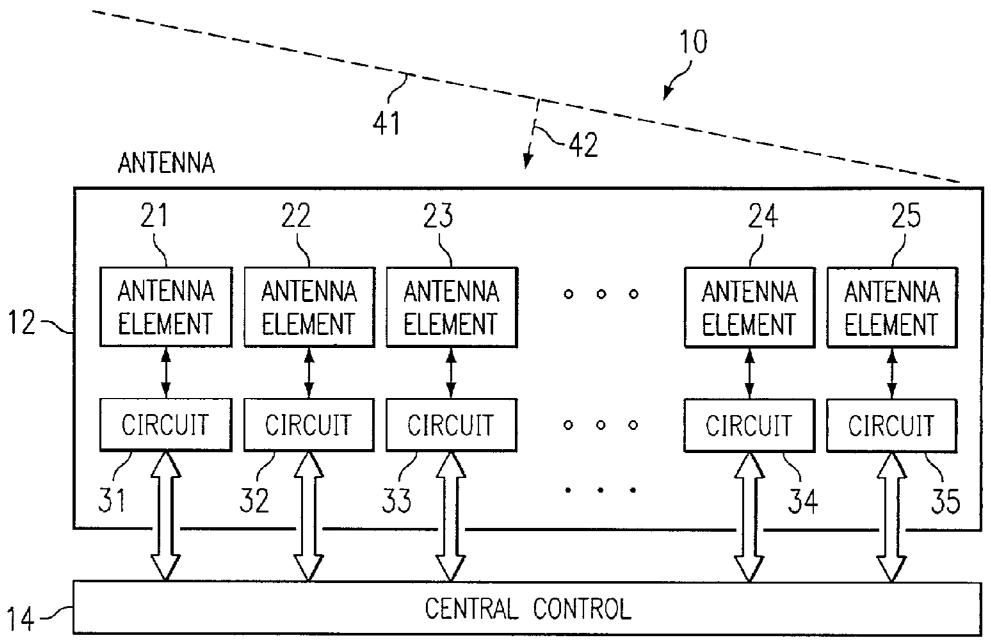
FIG. 1 is a block diagram of an antenna system which embodies aspects of the present invention.

FIG. 1 is a block diagram of an apparatus which is a phased array antenna system 10 that embodies the present invention. The antenna system 10 includes an antenna 12, and a central control circuit 14.

The antenna 12 includes a plurality of physically separate antenna elements, five of which are shown diagrammatically at 21–25. In the disclosed embodiment, the antenna elements are arranged in a two-dimensional array of rows and columns, and the illustrated antenna elements 21–25 represent a subset of the antenna elements from one row of the array.

The antenna 12 also includes a plurality of circuits, five of which are shown at 31–35. Each circuit is associated with a respective antenna element. Thus, the number of circuits is equal to the number of antenna elements. Each of these circuits serves an interface between a respective antenna element and the central control circuit 14. The circuits 31–35 are each physically located at the antenna, in relatively close physical proximity to a respective one of the antenna elements 21–25.

The antenna system 10 can both transmit and receive electromagnetic signals. The broken line 41 represents the wavefront of an electromagnetic signal which is approaching the antenna system 10 in a direction 42, where the direction 42 forms an angle with respect to the plane containing all of the antenna elements in the array. Consequently, the electromagnetic signal 41 will not reach all of the antenna elements simultaneously. For example, it will reach the antenna element 25 first, then the antenna element 24, eventually the antenna element 23, then the antenna element 22, and then the antenna element 21.

For purposes of discussing the disclosed embodiment, it is assumed that antenna 12 has a physically large array of the antenna elements 21–25, and that the electromagentic signal 41 is a wideband signal. While the present invention can be utilized in systems that involve smaller arrays and/or narrowband signals, it is particularly advantageous in the context of a large array which transmits and receives wideband signals. In this regard, the antenna elements 21–25 should ideally sample the electromagnetic signal 41 at substantially the same point in time. but in the case of a large array and a wideband electromagnetic signal, the information in the signal may change between the point in time when the signal reaches the antenna element 25 and the subsequent point in time when the signal reaches the antenna element 21. In this context, simply applying a respective phase shift to the signal from each antenna element 21–25 does not provide sufficient accuracy.

Therefore, a common pre-existing approach was to apply various time delays to the analog signals from the different antenna elements prior to sampling them, such that the electromagnetic signal 41 would effectively be sampled at the same point in time for each antenna element, instead of being sampled at different points in time in conjunction with the subsequent application of different phase shifts to the respective samples in order to obtain temporal alignment. However, this approach involved the use of programmable analog time delay units and phase shifters which are large and heavy, and which needed to be matched and calibrated. Further, analog circuitry was provided to receive the radio frequency (RF) signal and down convert it to an intermediate frequency (IF) signal before digitization, which required additional circuitry that added to the size and complexity of the analog circuit provided for each antenna element.

In contrast, in the disclosed embodiment, electromagnetic signals received at the antenna elements 21–25 are relatively promptly digitized while at RF frequencies, and subsequent processing, such as the implementation of time delays, is carried out digitally. Similarly, when the antenna system 10 is transmitting a signal, time delays and other processing of the signal components are carried out digitally, and then the component digital signals are each converted to an RF analog signal almost immediately before being transmitted. The following discussion explains in more detail how this is carried out. In this regard, the circuits 31–35 of the antenna 12 are identical in the disclosed embodiment, and therefore only the circuit 31 is described below in detail.

Figure 2:
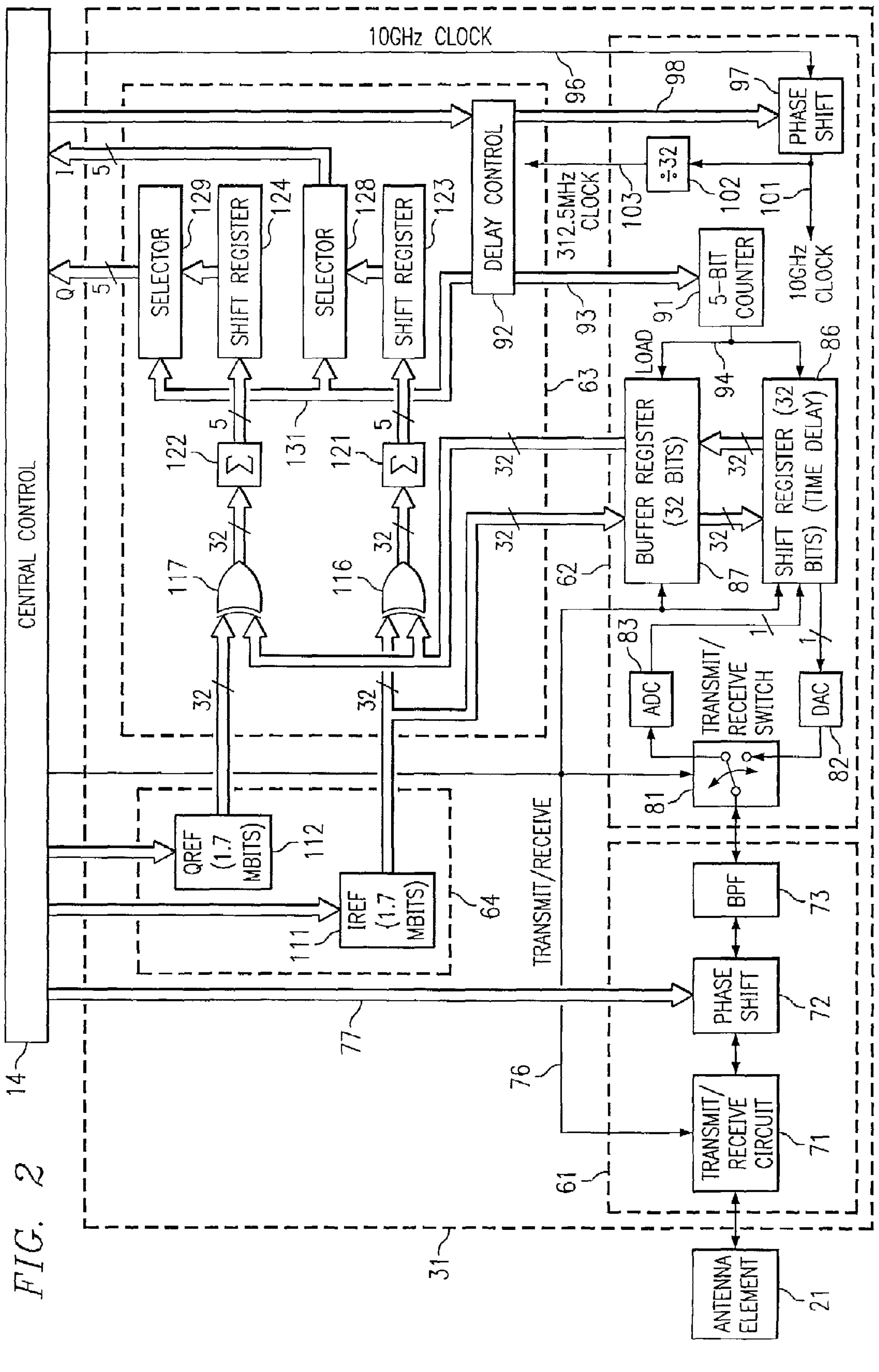
FIG. 2 is a block diagram of selected portions of the antenna system of FIG. 1, showing details of a circuit disposed within the antenna system of FIG. 1.

More specifically, FIG. 2 is a block diagram showing the central control circuit 14, the antenna element 21, and the circuit 31 which interfaces the antenna element 21 to the central control circuit 14. The circuit 31 has an analog section identified by broken line 61, a digital high speed section identified by broken line 62, a digital reduced speed section identified by broken line 63, and a digital reference signal generator section identified by broken line 64. The digital high speed section 62 operates at a clock speed of 10 GHz, and in the disclosed embodiment is implemented with high speed indium phosphide (InP) semiconductor technology of a known type. The digital reduced speed section 63 and the digital reference signal generator section 64 each operate at $1/32$ the speed of the high speed section 62, in particular at a clock speed 312.5 MHz. In the disclosed embodiment, the sections 63 and 64 are implemented with complementary metal oxide semiconductor (CMOS) integrated circuitry.

The analog section 61 includes a transmit/receive circuit 71, a phase shifter 72 and a bandpass filter (BPF) 73 which are coupled in series between the antenna element 21 and the digital high speed section 62. The transmit/receive circuit 71 operates in either a transmit mode or a receive mode, based on the state of a transmit/receive control line 76 from the central control circuit 14. The phase shifter 72 can induce a phase shift into transmit or receive signals passing through it, the amount of the phase shift being programmable through control lines 77 from the central control circuit 14. In the disclosed embodiment, signals are transmitted and received through the antenna element 21 at a frequency of 7.5 GHz, but it would alternatively be possible to use some other frequency. The BPF 73 has a 5 GHz pass band which is centered on a transmit/receive frequency of 7.5 GHz, or in other words has a pass band from about 5 GHz to about 10 GHz. However, it will be recognized that the characteristics of the pass band could be varied.

The digital high speed section 62 includes an electronic switch 81 which is controlled by the transmit/receive signal 76 from the central control circuit 14. In the transmit mode, the switch 81 couples the BPF 73 to a digital-to-analog converter (DAC) 82. In the receive mode, the switch 81 couples the BPF 73 to an analog-to-digital converter (ADC) 83. The DAC 82 has an input which is coupled to an output of a 32-bit bi-directional shift register 86, and the ADC 83 has an output which is coupled to an input of the shift register 86.

The shift register 86 is supplied with a free-running 10 GHz clock, and the direction in which data shifts through the register 86 is controlled by the state of the transmit/receive line 76 from the central control circuit 14. The shift register 86 is associated with a buffer register 87, which is also responsive to the transmit/receive control line 76. Words of 32-bit data can be transferred from the buffer register 87 to the shift register 86 in the transmit mode, and from the shift register 86 to the buffer register 87 in the receive mode.

A 5-bit counter provides a delay control function which is controlled by a delay control circuit 92 through control lines 93, the delay control circuit 92 being part of the digital reduced speed section 63. The counter 91 is clocked with a 10 GHz clock signal, and provides a divide-by-32 function. In particular, on every 32 d clock pulse, the counter 91 activates a load control line 94. In the receive mode, the load control line 94 causes a 32-bit word received in the shift register 86 to be loaded into the buffer register 87. In the transmit mode, the load control line 84 causes the shift register 86 to be loaded with data from the buffer register 87 each time the shift register has finished transmitting 32 bits of data. The initial value loaded into the counter 92 by the delay control circuit 92 determines when the load signal 94 is generated in relation to other activity within the circuit 31, thus permitting a programmable time delay to be introduced into data being transmitted or received by the circuit 31.

The central control circuit 14 outputs a 10 GHz clock signal 96. The digital high speed section 62 includes a phase shifter 97, which effects a phase shift of the clock signal 96 by an amount controlled at 98 by the delay control circuit 92. The amount of this phase shift can be different in the various circuits 31–35. The output of the phase shifter 97 is a phase-adjusted 10 GHz clock signal 101, which is used to operate the various components of the digital high speed section 62. A divide-by-32 circuit 102 converts the 10 GHz clock signal 101 into a 312.5 MHz clock signal 103, which is supplied to the components of the sections 63 and 64. The phase shifter 97 can adjust the phases of the 10 GHz clock signal 101 and the 312.5 MHz clock signal 103 by an amount which is less than one period of the 10 GHz clock signal 96. This permits fine tuning of the timing of the operation of the circuit 31 relative to other circuits in the antenna, such as those shown at 32–35 in FIG. 1.

The digital reference signal generator section 64 includes an IREF signal generator 111 and a QREF signal generator 112. The IREF generator 111 is used for both transmit and receive, and the QREF generator is used only for receive. Before each receive operation, the central control circuit 14 loads each of the generators 111 and 112 with a respective reference signal, which is 1.7 megabits in length. Before each transmit operation, the generator 111 is loaded with such a reference signal. Each reference signal may be viewed as a serial stream of binary bits which is 1.7 megabits long, and which is a digitized version of a reference analog waveform. The QREF signal and the IREF signal used for the receive mode represent the same analog waveform, but with a phase difference of 90°.

In theory, each of the generators 111 and 112 would output the 1.7 megabits of its respective reference signal one bit at a time, at a rate of 10 GHz. However, as mentioned above, the generators 111 and 112 operate at a clock speed of 312.5 MHz, which is 1⁄32 of 10 GHz. Consequently, in order to output bits at an effective rate of 10 GHz, each of the reference generators 111 and 112 outputs its serial bit stream in successive 32-bit segments at a rate of 312.5 MHz. The generators 111 and 112 can be implemented as random access memories which each contain a plurality of 32-bit storage locations, where the 32-bit words in the memory locations are successively accessed and output at a rate of 312.5 MHz.

The outputs of the IREF generator 111 are coupled to inputs of the buffer register 87, and also to inputs of thirty-two separate exclusive OR gates, which are represented collectively in FIG. 2 by a single gate symbol 116. The outputs of the QREF generator 112 are coupled to inputs of thirty-two exclusive OR gates, which are represented collectively in FIG. 2 by a single gate symbol 117.

During transmit mode, the 1.7 megabit reference signal in the generator 111 is supplied in 32-bit segments to the buffer register 87, and then to the shift register 86, where the bits are sent serially to the DAC 82 at a rate of 10 GHz. The analog output from the DAC 82 is supplied through the switch 81, BPF 73, phase shifter 72 and transmit/receive circuit 71 to the antenna element 21.

During receive mode, an electromagnetic signal received at the antenna element 21 is converted into an analog signal by the transmit/receive circuit 71, and then passes through the phase shifter 72, BPF 73 and switch 81 to the ADC 83, where it is digitized into a 10 GHz bit stream which is supplied to the shift register 86. The bits shifted into the shift register 86 at 10 GHz are supplied in 32-bit segments through the buffer register 87 to the inputs of all of the sixty-four exclusive OR gates 116–117.

In the receive mode, respective bits of one reference signal from the IREF generator 111 are supplied to the inputs of the respective gates 116, and respective bits of the other reference signal from the QREF generator 112 are supplied to the inputs of the respective gates 117. Each of the exclusive OR gates 116–117 serves effectively as a 1-bit digital multiplier or mixer, such that the gates 116–117 collectively mix the received signal with the two reference signals from the generators 111 and 112. In the disclosed embodiment, the reference signals from the generators 111 and 112 represent a waveform with a lower frequency than the frequency of the received signal, and thus the gates 116 and 117 effectively implement a down conversion of the frequency of the received signal.

The outputs of the thirty-two gates 116 are all summed in an adder 121, in order to produce a single 5-bit number which is supplied to inputs of a 5-bit wide shift register 123. Similarly, the outputs of the thirty-two gates 117 are all summed in an adder 122, in order to produce a 5-bit number which is supplied to inputs of a different 5-bit wide shift register 124. Thus, each 32-bit segment received through the shift register 86 and the buffer register 87 produces one 5-bit number in the shift register 123, and one 5-bit number in the shift register 124. The shift registers 123 and 124 each hold a plurality of these numbers.

A selector 128 can select any one of the 5-bit numbers in the shift register 123, and supply it to the central control circuit 14 as an "I" signal. Similarly, a selector 129 can select any one of the 5-bit numbers in the shift register 124, and supply it to the central control circuit 14 as a "Q" value. The particular location along each shift register from which the 5-bit numbers are extracted by the selectors is determined by control lines 131 from the delay control circuit 92. It will be noted that the shift registers 123–124 and the selectors 128–129 effectively implement a programmable delay in the outputs of the adders 121 and 122.

Figure 3:
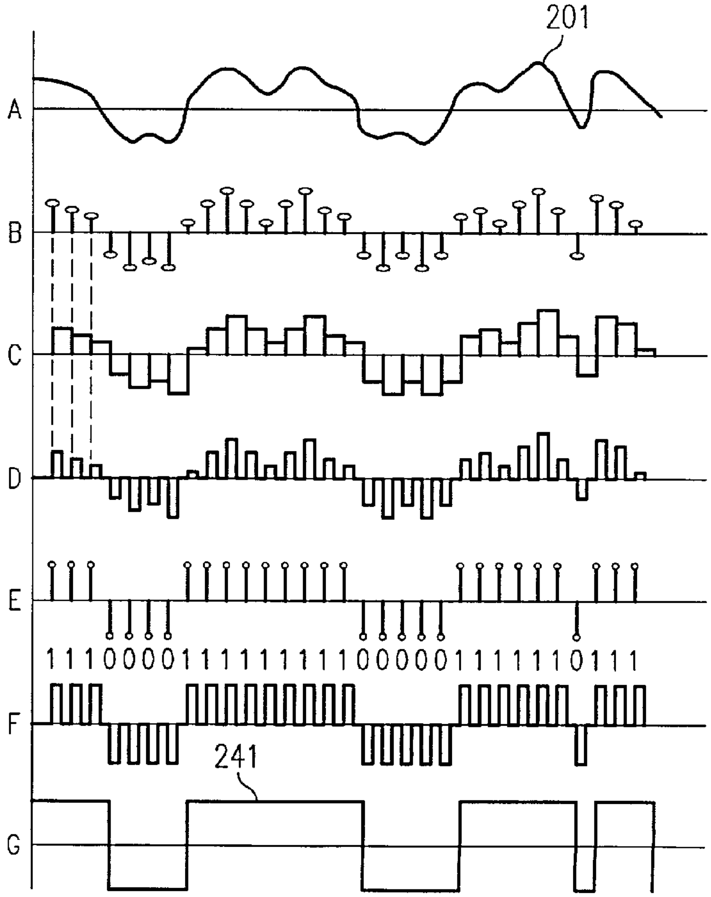
FIG. 3 is a timing diagram showing several waveforms.

A distinctive aspect of the operation of the DAC 82 will now be described. In this regard, FIG. 3 is a timing diagram showing at A an analog waveform 201 which is part of a reference waveform that might be represented digitally by the IREF information in the generator 111. In FIG. 3, B represents a digitized version of the waveform 201, in the form of a plurality of successive samples. If a straight line segment is drawn between the ends of each adjacent pair of the samples at B in FIG. 3, these line segments will together define a waveform which approximates the waveform 201. If the samples shown at B were successively supplied to the input of a standard DAC, the standard DAC would essentially produce a series of pulses as shown at C, where each pulse has a magnitude equal to the magnitude of the corresponding sample, and has a duration equal to the time interval between successive samples.

Figure 4:
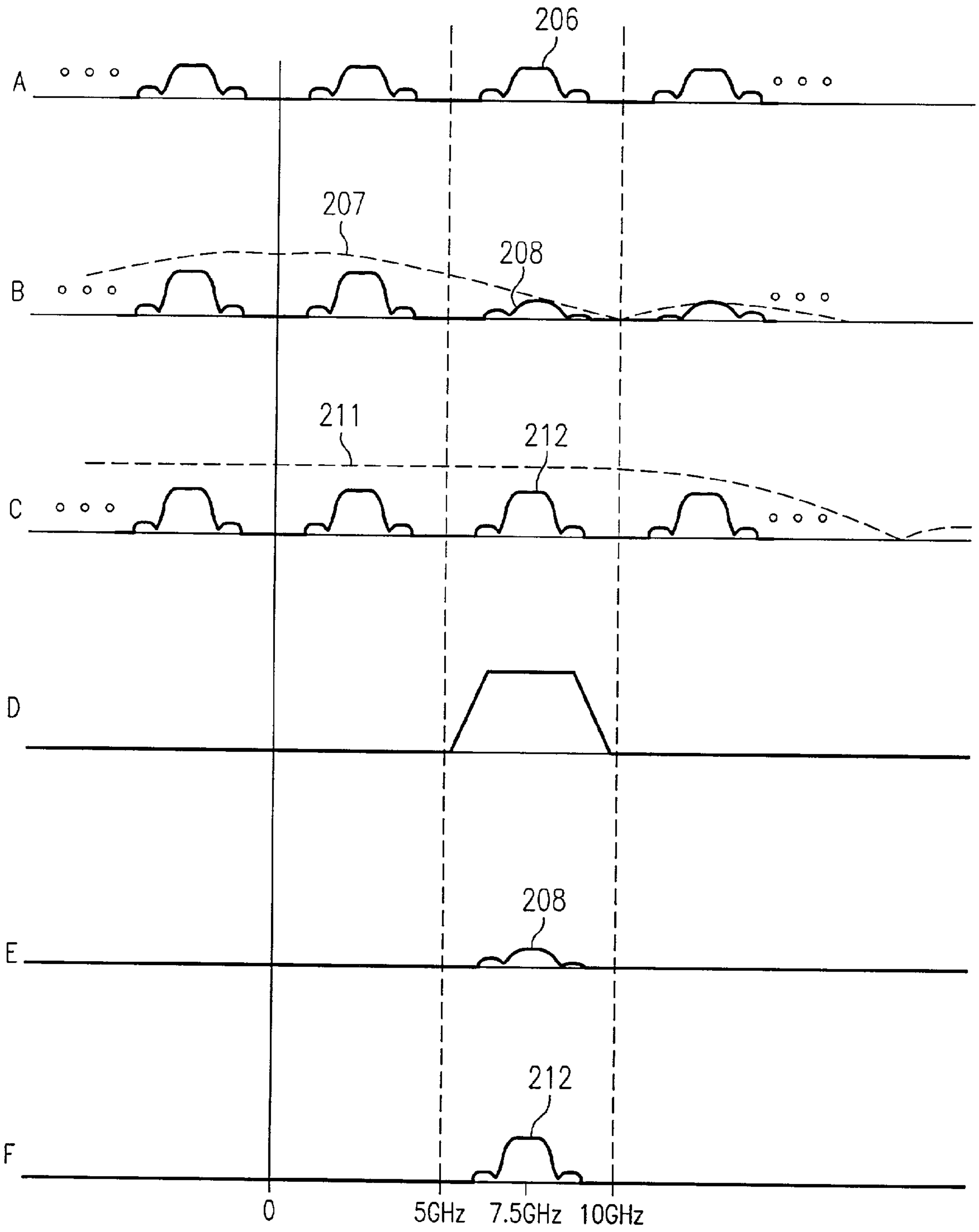
FIG. 4 is a diagram showing several different frequency characteristics.

FIG. 4 is a diagrammatic view of several frequency characteristics. FIG. 4 shows at A the frequency spectrum determined by Fourier transform for the digital waveform which is shown at B in FIG. 3. The presence of energy at negative frequencies is a reflection of the fact that this frequency spectrum is determined mathematically through Fourier analysis, rather by empirical measurement. FIG. 4 shows at B a representation of the pass band of the BPF 73

(FIG. 2), which corresponds to the desired transmit spectrum. With reference to A in FIG. 4, reference numeral 206 denotes the portion of the energy which is within the desired transmit spectrum.

If the output from a standard DAC, as shown at C in FIG. 3, is subjected to the same Fourier transform, the result will be the frequency spectrum shown at B in FIG. 4. It will be noted that the magnitude of the energy distribution has a roll-off 207 which is relatively pronounced within the desired transmit spectrum, such that the portion of the energy 208 within the desired transmit spectrum has a distorted spectrum with an asymmetric reduction in magnitude. If the spectrum shown at B in FIG. 4 was subjected to the band pass filtering characteristic shown at D for the BPF 73, the result would be the spectrum 208 shown at E in FIG. 4.

In order to change the roll-off characteristic and thus avoid unwanted distortion within the desired transmit spectrum, the DAC 82 of the disclosed embodiment operates differently from a standard DAC. In particular, in response to each of the samples shown at D in FIG. 3, the DAC 82 would produce the series of pulses shown at D in FIG. 3, where each pulse has the same magnitude as the associated sample, but has a duration which is only half the time interval between successive samples. During each time interval between two successive pulses, the DAC output returns to a predetermined voltage which, in the disclosed embodiment, is zero volts. When the waveform shown at D in FIG. 3 is subjected to the same Fourier transform discussed above, the result is the frequency spectrum shown at C in FIG. 4. It will be noted that the roll-off characteristic indicated by the broken line 211 maintains a suitable and uniform magnitude throughout the desired transmit spectrum, such that the portion 212 of the energy which is within the desired transmit spectrum has little or no distortion, and conforms relatively closely to the energy characteristic 206 in the spectrum A of FIG. 4. If the signal shown at D in FIG. 3 was subjected to band pass filtering by the filtering characteristic shown at D in FIG. 4, the result would be the spectrum shown at F in FIG. 4.

In the disclosed embodiment, and as discussed above, the DAC 82 operates at a frequency of 10 GHz. To facilitate digital to analog conversion at this frequency, the digital samples supplied to the input of the DAC 82 are each a single binary bit. Each sample can thus only have one of two different states. In this regard, and as discussed above, the IREF information output by the generator 111 is a serial stream of binary bits having a length of 1.7 megabits, and is a digital representation of an analog waveform, where each digital sample is a single bit. Thus, for example, if the IREF information was a representation of the waveform 201 shown at A in FIG. 3, the digital samples would be as shown at E in FIG. 3, rather than at B.

The samples at E each have a uniform magnitude, although some are positive and some are negative. Those with a positive magnitude would each be represented by a binary "1", and those with a negative magnitude would each be represented by a binary "0". In a sense, this is simply the sign bit of each sample shown at B in FIG. 3, since each sample at B with a positive magnitude has a sign bit of "1", and each sample at B with a negative magnitude has a sign bit of "0". When the samples shown at E in FIG. 3 are applied in sequence to the input of the DAC 82, the resulting output would be as shown at F in FIG. 3. The waveform at F in FIG. 3 enjoys the same favorable roll-off characteristic which is shown at 211 in FIG. 4, rather than the distorted roll-off characteristic shown at 207 in FIG. 4.

As discussed above, the reference waveform represented in digital form by the IREF information in generator 111 is configured in the disclosed embodiment as a series of successive samples which are each one binary bit. That is, each sample is either a binary "1" or a binary "0". Thus, for example, the reference waveform 201 of FIG. 3 will be represented by samples such as those shown diagrammatically at E in FIG. 3. If a waveform is reconstructed directly from the samples shown E in FIG. 3, it will have generally the shape of the waveform 241 shown at G in FIG. 3.

The waveform 241 is, of course, an approximation of the waveform 201, and is not identical to the waveform 201. In essence, the waveform 241 represents the waveform 201 with the addition of various harmonics. In other words, when a waveform such as that shown at 201 is digitized using 1-bit samples, the resulting digital signal includes unwanted harmonics. The disclosed embodiment includes provisions which substantially reduce these unwanted harmonics. This is explained in more detail with reference to FIG. 5.

Figure 5:
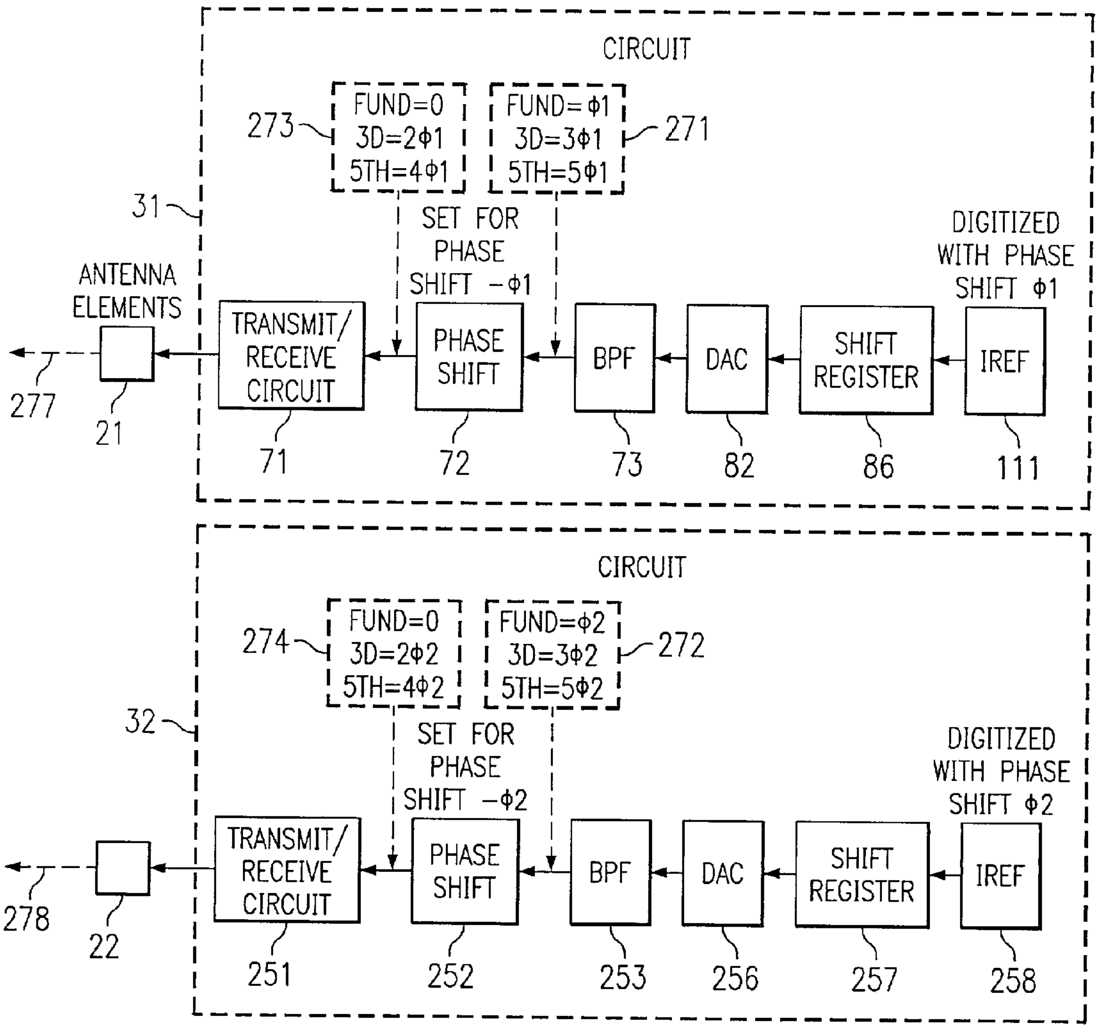
FIG. 5 is a block diagram showing selected portions of the system of FIG. 1 in greater detail.

More specifically, FIG. 5 is a block diagram showing two of the antenna elements 21 and 22 from FIG. 1, and the associated circuits 31 and 32. The circuit 31 has already been described in detail with reference to FIG. 2, and selected components of this circuit are depicted in FIG. 5, including the transmit/receive circuit 71, phase shifter 72, BPF 73, DAC 82, shift register 86, and IREF generator 111. As mentioned above, the circuit 32 is identical to the circuit 31, and FIG. 5 thus shows components 251–253 and 256–258 of the circuit 32 which are respectively equivalent to the components 71–73, 82, 86 and 111 of the circuit 31.

For purposes of the following discussion of FIG. 5, assume that the antenna system is to transmit electromagnetic signals corresponding to a reference waveform, which is the waveform 201 of FIG. 3. Ideally, this waveform would be digitized into 1-bit samples as shown at E in FIG. 3, in order to obtain the IREF information, and the same IREF information would be stored in each of the IREF generators 111 and 258. The timing of the shift registers 86 and 257 would be controlled to introduce appropriate respective time delays into each signal so that, when each signal is transmitted from a respective antenna element 21 or 22, the resulting wavefront will be directed or steered in the desired direction relative to the antenna.

However, as discussed above, the representation of the reference waveform with 1-bit samples introduces unwanted harmonics into the digitized version of the waveform. Therefore, instead of the ideal approach just described, the disclosed embodiment takes a different approach which reduces the unwanted harmonics. To achieve this, the waveforms stored in the generators 111 and 258 are not identical. Instead, the reference waveform 201 is given an arbitrary phase shift $\phi 1$ relative to a reference, and is then digitized into the 1-bit samples which are stored in the IREF generator 111. Separately, the same reference waveform 201 is given a different phase shift $\phi 2$ with respect to the same reference, and is then digitized into 1-bit samples which are stored in the IREF generator 258. The shift registers 86 and 257 then impart appropriate time delays to the respective signals in order to properly steer the waveform which is to be transmitted. The digital signals from the shift registers are then converted into respective analog signals by the DAC 83 and DAC 256, and then the resulting analog signals are subjected to bandpass filtering at 73 and 253.

In the present context, where the digital reference signal is effectively a square wave signal, odd harmonics are more dominant than even harmonics. Moreover, with respect to the phase shifts ϕ1 or ϕ2 which are added before digitization, the harmonics do not receive the same phase shift as the fundamental signal. More specifically, and with reference to block 271 in FIG. 5, at the output of BPF 73 the fundamental signal will have a phase shift of ϕ1, the third harmonic will have a phase shift of 3ϕ1, the fifth harmonic will have a phase shift of 5ϕ1, the seventh harmonic will have phase shift of 7ϕ1, and so forth. Similarly, and with reference to block 272 in FIG. 5, at the output of the BPF 253 the fundamental will have a phase shift of ϕ2, the third harmonic will have a phase shift of 3ϕ2, the fifth harmonic will have a phase shift of 5ϕ2, the seventh harmonic will have a phase shift of 7ϕ2, and so forth.

In the example under discussion, the phase shifter 72 in the circuit 31 is set to implement a phase shift of −ϕ1, which is opposite and equal to the phase shift 01 introduced before digitization of the IREF information for the generator 111. The phase shifter 252 in the circuit 32 is set to implement a phase shift of −ϕ2, which is opposite and equal to the phase shift ϕ2 introduced before digitization of the IREF information for the generator 258. Therefore, and with reference to block 273 in FIG. 5, at the output of the phase shifter 72 the fundamental will have a phase shift of zero, the third harmonic will have a phase shift of 2ϕ1, the fifth harmonic will have a phase shift of 4ϕ1, the seventh harmonic will have a phase shift of 6ϕ1, and so forth. Similarly, with reference to block 274, at the output of the phase shifter 252 the fundamental will have a phase shift of zero, the third harmonic will have a phase shift of 2ϕ2, the fifth harmonic will have a phase shift of 4ϕ2, the seventh harmonic will have a phase shift of 6ϕ2, and so forth.

Consequently, when the signals output by the phase shifters 72 and 252 are thereafter respectively transmitted as electromagnetic signals through the antenna elements 21 and 22, as indicated diagrammatically at 277 and 278, the fundamentals in each of these electromagnetic signals will have a phase shift of zero and will therefore add coherently in free space, and the time delays introduced into these signals by the shift registers 86 and 257 will cause appropriate steering of the resulting wavefront for the fundamental.

In contrast, the third harmonic transmitted by antenna element 21 will have a phase shift of 2ϕ1 whereas the same harmonic transmitted by antenna element 22 will have a different phase shift of 2ϕ2, and the respective electromagnetic signals representing the third harmonics will therefore tend to add non-coherently in free space. FIG. 5 shows only two antenna elements 21 and 22 with their associated circuits 31 and 32, but it will be recognized that where a variety of phase shifts are used for all of the respective antenna elements in the array, the result will be non-coherent addition of the third harmonics in an effective and efficient manner that causes the wavefront for the fundamental to have little or no significant presence of the third harmonic. In a similar manner, the other harmonics are also out of phase and tend to add non-coherently in free space, and thus have little or no significant presence in the wavefront for the fundamental.

Although the reduction of harmonics through the addition and removal of phase shifts has been described above in the context of the transmit mode, it can also be used for the receive mode. In this regard, the phase shifters 72 and 252 can be used in the receive mode to introduce respective different phase shifts into respective signals received by the antenna elements 21 and 22, after which these phase-shifted signals are digitized into 1-bit samples. As discussed above, this digitization technique introduces unwanted harmonics. Thereafter, these signals are converted into the I and Q signals which are delivered to the central control circuit 14 (FIGS. 1 and 2). The central control circuit 14 can apply respective phase shifts equal and opposite to those introduced by the phase shifters 72 and 252, and can then combine the resulting signals, so that the components representing the fundamental add coherently and the components representing harmonics add non-coherently.

The present invention provides a number of technical advantages. One such technical advantage results from the use of low precision digital devices to generate a transmit waveform in a highly distributed manner. This digital generation of waveforms involves circuitry of reduced size, weight, power and cost in comparison to pre-existing circuits for analog waveform generation. Respective time delays for respective component signals are readily accomplished in the digital domain using shift registers and other logic. A related advantage is that, in the context of a radar system, the circuitry of the antenna is primarily digital circuitry rather than radio frequency circuitry, and interfaces between the antenna and a central control system are all digital.

Another advantage results from the generation of transmit waveforms using digital reference waveforms defined by multiple samples which are each a single binary bit. By introducing a respective phase shift before digitization of the reference waveform for each antenna element, and removing the same phase shift after digitization, harmonics resulting from use of one-bit samples are greatly reduced in the transmitted wavefront, because the fundamentals of the transmit waveform add coherently in space, while the harmonics add noncoherently.

Another advantage results from the use of digital-to-analog converters that produce for each sample a pulse having a duration less than the time interval between samples, the output of the converter returning to zero during the time interval between adjacent pulses. This technique permits transmission of a waveform which closely approximates the quality of the waveform that would be generated and transmitted by pre-existing analog techniques, but with significant reductions in size, weight, power and cost for the relevant circuitry.

A further advantage results from the fact that a separate transmitter/receiver circuit is provided for each antenna element, whereas the traditional analog approach uses a single transmitter/receiver to handle a single signal which is subjected to respective phase shifts or time delays between the transmitter/receiver and respective antenna elements. Consequently, the disclosed embodiment provides capabilities which are not present in pre-existing analog configurations. For example, it would be possible to use only a subset of the antenna elements in the antenna array. Alternatively, different subsets of the antenna elements could be used at the same time to transmit different waveforms.

Still another advantage results in the receive mode, when a respective phase shift is introduced into the analog signal from each antenna element before it is digitized, and then the same phase shift is removed after digitization. When the signals derived from different antenna elements are then combined, the components for the fundamental add coherently whereas the components for harmonics add non-coherently, thereby greatly reducing harmonics introduced by the digitization. This is particularly advantageous where the digitization process involves the use of one-bit samples.

Although one embodiment has been illustrated and described in detail, it will be understood that various substitutions and alterations are possible without departing from the spirit and scope of the present invention, as defined by the following claims.

What is claimed is:

1. An apparatus, comprising:

a first section which outputs first and second digital signals, said first digital signal representing a predetermined waveform with a first phase shift imparted thereto in relation to a reference, said second digital signal representing substantially said predetermined waveform with a second phase shift imparted thereto in relation to said reference, said second phase shift being different from said first phase shift;

a digital-to-analog converter section which converts said first and second digital signals respectively into first and second analog signals;

a phase shift section which produces a first adjusted signal by imparting to said first analog signal a phase shift which is substantially equal and opposite to said first phase shift, and which produces a second adjusted signal by imparting to said second analog signal a phase shift which is substantially equal and opposite to said second phase shift; and a second section operable to facilitate combining of said first and second adjusted signals.

2. An apparatus according to claim 1, wherein said second section includes a transmitter section which transmits first and second electromagnetic signals that respectively include said first and second adjusted signals.

3. An apparatus according to claim 2, wherein said transmitter section includes first and second antenna elements which are physically spaced from each other, said first and second electromagnetic signals being respectively transmitted through said first and second antenna elements.

4. An apparatus according to claim 1, including a filter section which effects bandpass filtering of said first analog signal before said first analog signal is supplied to said phase shift section, and which effects bandpass filtering of said second analog signal before said second analog signal is supplied to said phase shift section.

5. An apparatus according to claim 1, wherein said first and second digital signals each have a plurality of successive states, each of said states being a selected one of first and second predetermined states which are different.

6. An apparatus according to claim 1, wherein said first and second digital signals each have a plurality of successive states;

wherein said digital-to-analog converter section generates for each said state of said first digital signal a respective corresponding pulse of said first analog signal which has a duration less than the duration of the corresponding state, said digital-to-analog converter section outputting a predetermined voltage between successive said pulses of said first analog signal; and wherein said digital-to-analog converter section generates for each said state of said second digital signal a respective corresponding pulse of said second analog signal which has a duration less than the duration of the corresponding state, said digital-to-analog converter section outputting a predetermined voltage between successive said pulses of said second analog signal.

7. An apparatus, comprising:

a generator section which outputs a digital signal having a plurality of successive states;

a digital-to-analog converter section which converts said digital signal into an analog signal, said digital-to-analog converter section generating for each said state of said digital signal a respective corresponding analog pulse which has a duration less than the duration of the corresponding state, said digital-to-analog converter section outputting a predetermined voltage between successive said pulses.

8. An apparatus according to claim 7, including a transmitter section which transmits an electromagnetic signal that includes said analog signal.

9. An apparatus according to claim 8, including a band pass filter which processes said analog signal before transmission of said analog signal by said transmitter section.

10. An apparatus according to claim 7, wherein said predetermined voltage is approximately zero volts.

11. An apparatus according to claim 7, wherein each said pulse has a duration which is approximately half the duration of the corresponding state of said digital signal.

12. An apparatus according to claim 7, wherein each said state of said digital signal is a selected one of first and second predetermined states which are different.

13. An apparatus according to claim 12, wherein said digital-to-analog converter generates a positive pulse having a predetermined magnitude when the corresponding state of said digital signal is said first predetermined state, and generates a negative pulse having said predetermined magnitude when the corresponding state of said digital signal is said second predetermined state; and wherein said predetermined voltage is approximately zero volts.

14. An apparatus according to claim 13, wherein each said pulse has a duration which is approximately half the duration of the corresponding state of said digital signal.

15. An apparatus according to claim 14, wherein each said pulse has approximately a square wave shape.

16. An apparatus, comprising:

a first section which outputs first and second analog signals, said first analog signal representing a predetermined waveform and said second analog signal representing substantially said predetermined waveform;

a first phase shift section which produces a first shifted signal by imparting to said first analog signal a first phase shift, and which produces a second shifted signal by imparting to said second analog signal a second phase shift different from said first phase shift;

an analog-to-digital converter section which converts said first and second shifted signals respectively into first and second digital signals;

a further phase shift section which produces a first adjusted signal by imparting to said first digital signal a phase shift which is substantially equal and opposite to said first phase shift, and which produces a second adjusted signal by imparting to said second digital signal a phase shift which is substantially equal and opposite to said second phase shift; and a second section operable to facilitate combining of said first and second adjusted signals.

17. An apparatus according to claim 16, wherein said first section includes a receiver section which has two spaced antenna elements, and which receives substantially the same electromagnetic signal through each of said antenna elements, said first and second analog signals each being derived from a respective one of said antenna elements.

18. An apparatus according to claim 16, including a filter section which effects bandpass filtering of said first shifted signal before said first shifted signal is supplied to said analog-to-digital converter section, and which effects bandpass filtering of said second shifted signal before said second shifted signal is supplied to said analog-to-digital converter section.

19. An apparatus according to claim 16, wherein said first and second digital signals each have a plurality of successive states, each of said states being a selected one of first and second predetermined states which are different.

20. A method, comprising the steps of:

producing first and second digital signals, said first digital signal representing a predetermined waveform with a first phase shift imparted thereto in relation to a reference, said second digital signal representing substantially said predetermined waveform with a second phase shift imparted thereto in relation to said reference, said second phase shift being different from said first phase shift;

converting said first and second digital signals respectively into first and second analog signals;

imparting to said first analog signal a phase shift which is substantially equal and opposite to said first phase shift in order to obtain a first adjusted signal, and imparting to said second analog signal a phase shift which is substantially equal and opposite to said second phase shift in order to obtain a second adjusted signal; and combining said first and second adjusted signals.

21. A method according to claim 20, wherein said step of producing said first and second digital signals includes the step of configuring said first and second digital signals to each have a plurality of successive states, each of said states being a selected one of first and second predetermined states which are different.

22. A method according to claim 20, wherein said step of producing said first and second digital signals includes the step of configuring said first and second digital signals to each have a plurality of successive states;

wherein said converting step includes generating for each said state of said first digital signal a respective corresponding pulse of said first analog signal which has a duration less than the duration of the corresponding state, and outputting a predetermined voltage between successive said pulses of said first analog signal; and wherein said converting step includes generating for each said state of said second digital signal a respective corresponding pulse of said second analog signal which has a duration less than the duration of the corresponding state, an outputting a predetermined voltage between successive said pulses of said second analog signal.

23. A method, comprising the steps of:

generating a digital signal having a plurality of successive states; and converting said digital signal into an analog signal, including generating for each said state of said digital signal a respective corresponding analog pulse which has a duration less than the duration of the corresponding state, and outputting a predetermined voltage between successive said pulses.

24. A method according to claim 23, wherein said step of generating pulses is carried out so that each said pulse has a duration which is approximately half the duration of the corresponding state of said digital signal.

25. A method according to claim 23, wherein said step of generating said digital signal is carried out so that each said state of said digital signal is a selected one of first and second predetermined states which are different.

26. A method according to claim 25, wherein said step of generating pulses includes the steps of generating a positive pulse having a predetermined magnitude when the corresponding state of said digital signal is said first predetermined state, and generating a negative pulse having said predetermined magnitude when the corresponding state of said digital signal is said second predetermined state.

27. A method, comprising the steps of:

producing first and second analog signals, said first analog signal representing a predetermined waveform and said second analog signal representing substantially said predetermined waveform;

imparting to said first analog signal a first phase shift to obtain a first shifted signal, and imparting to said second analog signal a second phase shift different from said first phase shift to obtain a second shifted signal;

converting said first and second shifted signals respectively into first and second digital signals;

imparting to said first digital signal a phase shift which is substantially equal and opposite to said first phase shift in order to obtain a first adjusted signal, and imparting to said second digital signal a phase shift which is substantially equal and opposite to said second phase shift in order to obtain a second adjusted signal; and combining said first and second adjusted signals.

28. A method according to claim 27, wherein said converting steps are carried out in a manner so that said first and second digital signals each have a plurality of successive states, each of said states being a selected one of first and second predetermined states which are different.

* * * * *

UNITED STATES PATENT AND TRADEMARK OFFICE

CERTIFICATE OF CORRECTION

PATENT NO. : 7,079,588 B1
APPLICATION NO. : 10/028009
DATED : July 18, 2006
INVENTOR(S) : Paul E. Doucette et al.

It is certified that error appears in the above-identified patent and that said Letters Patent is hereby corrected as shown below:

Title Page item [56]:
Page 2, Right Column, Line 5, after "GPS/" please delete "GLONASSS" and insert -- GLONASS --.

Column 9, Line 16:
After "phase shift" delete "01" and insert -- ø1 --.

Signed and Sealed this

Twenty-ninth Day of July, 2008

JON W. DUDAS
*Director of the United States Patent and Trademark Office*